(No Model.) 2 Sheets—Sheet 1.
E. W. RICE, Jr.
METHOD OF MEASURING ELECTRIC CURRENTS.
No. 428,633. Patented May 27, 1890.

(No Model.) 2 Sheets—Sheet 2.

E. W. RICE, Jr.
METHOD OF MEASURING ELECTRIC CURRENTS.

No. 428,633. Patented May 27, 1890.

Witnesses
Ira R. Steward
Wm H Capel

Inventor
Edwin Wilbur Rice Jr.

By his Attorney
H. C. Townsend

UNITED STATES PATENT OFFICE.

EDWIN WILBUR RICE, JR., OF LYNN, MASSACHUSETTS.

METHOD OF MEASURING ELECTRIC CURRENTS.

SPECIFICATION forming part of Letters Patent No. 428,633, dated May 27, 1890.

Application filed March 8, 1889. Serial No. 302,543. (No model.)

*To all whom it may concern:*

Be it known that I, EDWIN WILBUR RICE, Jr., a citizen of the United States, and a resident of Lynn, in the county of Essex and State of Massachusetts, have invented a certain new and useful Method of Measuring Electricity, of which the following is a specification.

The object of my invention is to provide a simple and novel method of measuring the amount of electricity passing through an electric circuit.

To this end my invention consists in alternately heating two expansible rods, bars, or pieces of solid material by the agency of an electric current flowing alternately in two circuits or branches of a circuit, automatically switching the current from one branch to the other by the movement of said expansible bars, rods, or pieces as they alternately heat and cool, and registering or counting the number of movements of expansion and contraction of said rods, bars, or pieces.

Figure 1:
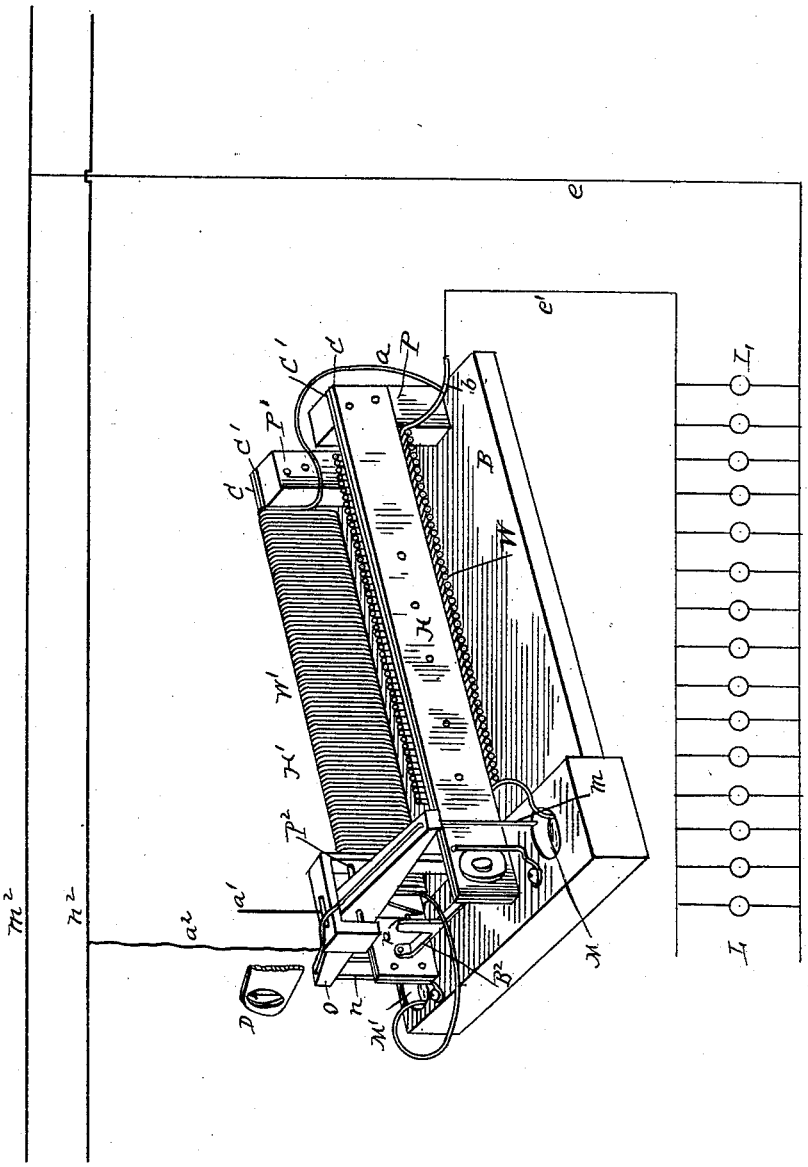
Figure 2:
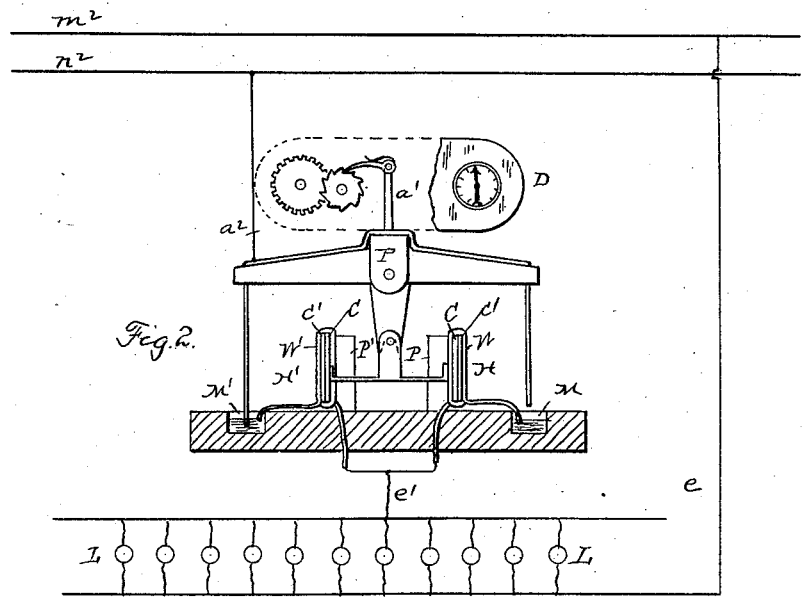

Figure 1 is a perspective view of an apparatus suitable for practicing my invention, and Fig. 2 is an end view of a part of the mechanism thereof.

Referring to Fig. 1, H indicates an expansible rod or bar made as a compound bar from two pieces of material C C', having different rates or coefficients of expansion, so that when said bar is heated its free end will flex or bend. The bar or rod is secured to a suitable base B.

W indicates an electric conductor forming the path of an electric current and applied to said bar, so that heat developed in the conductor by the passage of a current will be communicated to the bar. The movement of the bar H is imparted through a pin $p$, carried by a cross-bar $B^2$, to an arm $a'$, which itself serves as a measure of the expansion, or may, as indicated in Fig. 2, communicate movement to some other mechanism—such, for instance, as the wheel of a register-train. The movement of the part $a'$ sufficient to move the wheel one tooth will correspond obviously to a given or determinate amount of flow of current in the circuit including the conductor W. By causing a repetition of such movements the amount of current consumed through an extended length of time may be registered or measured. For this purpose an electric switch is employed in connection with the conductor W, so that it may be thrown alternately into and out of circuit. Preferably I employ, also, an auxiliary bar H', the action of which is similar to that of H.

Bar H' is a compound bar composed of two pieces of material C C', having different rates or coefficients of expansion and arranged to move under the influence of heat in an opposite direction to the bar H. The two are connected by a rod $B^2$, so that by this arrangement there is a compensation for variations of external temperature affecting them both. A similar conductor W' surrounds bar H', and is thrown into circuit alternately with W by means of an electric switch, consisting of a lever O, operated by a pin $p$, which is connected to the bar $B^2$. The switch O consists simply of two arms or contacts $m$ $n$, joined to one terminal of the circuit and adapted to dip alternately into the mercury-cups M M'. The coils W W' are connected, respectively, at one end to these mercury-cups and at their opposite ends to conductors $a$ $b$, which derive currents from a conductor $e'$.

The circuit in which the devices described are included is one which passes from the main $m^2$ through a wire $e$ and translating devices—such as electric lamps L—to wire $e'$, and through the devices mentioned to wire $a^2$, and thence to the conductor $n^2$.

In the operation of measuring the electric current the current flows first through conductor W', for instance, and develops heat therein, which heat, if communicated to the bar H', causes an expansion of the same. This movement of expansion is communicated to the arm $a'$, and by the connections with such arm is noted. When the current has flowed a determinate length of time, the lever O is moved by the bar to such an extent that the circuit through the conductor W' is broken and that through conductor W is closed. The current now flows in the conductor W and heats the same. The heat thus developed is communicated to the bar H, which bar expands in the well-known manner and communicates a movement to the lever O and device $a'$. This movement is noted, indicated, or registered, and on its completion is followed by the reversal of the switch and a repetition of the operations described, beginning with the heating of conductor W', occurs.

I have herein described one form of expansible solid material which may be employed for carrying out my invention; but I do not limit myself to a compound bar or to the particular shape of compound bar indicated, since it is obvious that the invention may be carried out by expanding any metal or solid material in any desired direction, such expansion being produced by the heat communicated from an electric conductor or conductors forming the path of an electric current and heated by such current.

While I have herein shown in Figs. 1 and 2 an apparatus for carrying my invention into effect, I do not claim the same in my present application, as I have made it the subject of a separate application filed of even date herewith, Serial No. 302,542.

What I claim as my invention is—

The herein-described method of measuring a current of electricity, consisting in alternately heating two expansible rods, bars, or pieces of solid material by the agency of an electric current flowing alternately in two circuits or branches of a circuit, automatically switching the current from one branch to the other by the movement of said expansible bars, rods, or pieces as they alternately heat and cool, and registering or counting the number of movements of expansion and contraction of said rods, bars, or pieces.

Signed at Lynn, in the county of Essex and State of Massachusetts, this 4th day of March, A. D. 1889.

EDWIN WILBUR RICE, Jr.

Witnesses:
WM. J. HALL,
J. W. GIBBONEY.